April 19, 1949.  W. H. STEWART  2,467,603

CASTER

Filed May 21, 1946

Inventor
William Henry Stewart
Per L. S. Mitchell
Attorney

Patented Apr. 19, 1949

2,467,603

UNITED STATES PATENT OFFICE 2,467,603

CASTER

William Henry Stewart, Heffley Creek, British Columbia, Canada

Application May 21, 1946, Serial No. 671,315

1 Claim. (Cl. 16—26)

My invention relates to casters, more particularly having reference to a roller caster designed for the support of heavy objects.

In the art to which the invention relates it has been proposed to provide a caster wherein the roller consists of a spherical supporting member mounted in a body attachable to the object to be supported and including anti-friction bearings, the caster being capable of movement in any direction.

The present invention contemplates improvement in casters of this character by which a more practical and efficient caster results.

One of the objects of the invention is accordingly to provide an improved caster for heavy objects in which a spherical member is mounted to revolve in a body providing novel and improved ball races by which better operation results.

A further object of the invention is to provide improved ball races for the caster in the form of liners capable of removal when they become worn.

A still further object of the invention is to provide on the body a skirt with dust excluder by which foreign particles may be excluded from the operating parts of the caster.

A still further object of the invention is to provide an improved ball for the caster formed of concentrically arranged sections of different grades of metal.

Other features and advantages of the invention will become apparent by reference to the accompanying description taken in conjunction with the drawings wherein.

Figure 1:
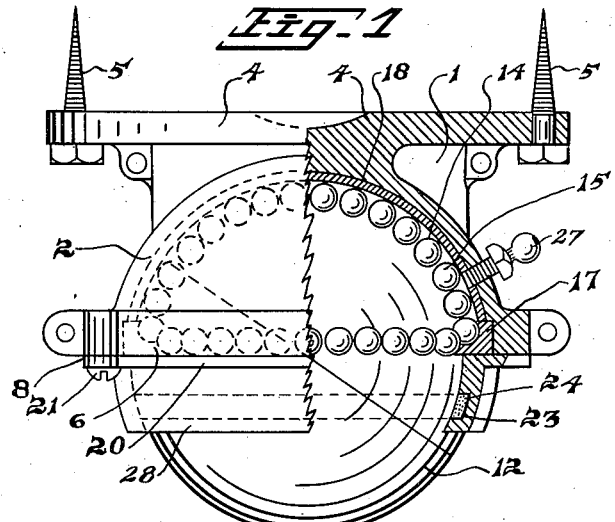
Fig. 1 is a side view of a roller caster embodying my improvements and shown partly broken away and partly in section to disclose the working parts.
Figure 2:
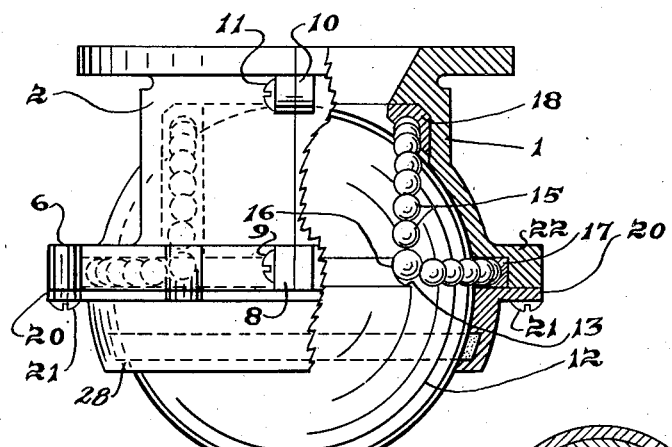
Fig. 2 is a view similar to Figure 1 but shown as viewed from a different side.

Having reference to the drawings, there is provided a body formed of mating halves 1 and 2, each providing a top plate section 4 by which the body may be attached to the object to be supported, for which suitable openings are provided in the sections 4 for reception of attaching screws 5 or the like.

The body halves 1 and 2 include annular flanges 6 with co-operating lugs 8, by which the body halves may be secured together to form a unitary whole, it being understood that on each side of the body is a pair of lugs, such as the lugs 8.

There are further provided integral lugs 10 under the plate portion for reception of bolts 11.

Within the body so formed is mounted a ball or spherical supporting member 12 which may be inserted or removed from the body by removal of the bolts 9 and 11. The ball 12 is designed for travel with the body supported thereon and with anti friction members.

For this two ball bearing races with suitable bearings are provided. The body halves are machined to provide race sections 13 within the body, one to each side, immediately to the upper side and parallel with the medial line of a ball in supporting relation to the body, with race sections 14 connecting therewith right angular thereto to form channels for the travel of ball bearings 15.

For travel of the bearings between the horizontal and vertical sections of the channels, the ends of the sections 13 are turned, as at 16, to direct the bearings between the two sections of the channel.

The channel sections 13 and 14 are preferably provided with liners 17 and 18, removable therefrom to replace worn parts, and adapted to take the wear of the bearings.

Additional to the body formed of the halves 1 and 2, there is provided a skirt 28 attached to the under side of the annular flange portions 6. For this the skirt includes a flange 20 with suitable openings for screws 21 engageable in offsets 22 on the flange portions 6.

The skirt 28 includes an annular recess 23 in which is set a packing 24, preferably of felt or the like, intimately contacting the ball member 12 to exclude dust or foreign particles from the operating parts of the caster.

Figure 3:
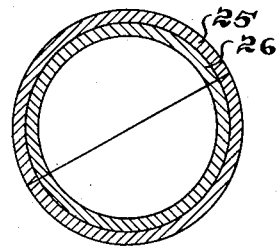
Fig. 3 shows a detail sectional view of a ball for the caster.

The ball or roller 12 is preferably formed of two halves (see Figure 3), and of concentrically arranged sections. This comprises an outer section 25 of pressed steel approximately one-eighth to three-sixteenths inches in thickness, and an inner section 26 of casting metal, approximately of one inch thickness, or substantially these relative amounts.

There is further included in the body half 1 an oil inlet 27 as shown.

The caster as herein provided is capable of carrying heavy loads, and is also adapted for replacement of worn parts.

While I have herein disclosed a preferred embodiment of the invention, changes in construction and form of parts would be permissible, and in so far as such changes come within the spirit and scope of the invention as defined in the appended claim, they would be considered a part hereof.

What I claim and wish to secure by Letters Patent is:

In a roller caster a body for attachment on an object to be supported, said body being adapted to mount a caster ball therein, and bearings for the ball comprising two similar races spaced apart providing opposing sections parallel with and immediately to the upper side of the medial line of a ball mounted in the body, said races including parallel sections right angular to said opposing sections and passing over the upper side of the ball, said races each providing continuous paths for travel of ball bearing therein.

WILLIAM HENRY STEWART.

REFERENCES CITED

The following references are of record in the file of this patent:

UNITED STATES PATENTS

| Number | Name | Date |
|---|---|---|
| 134,223 | Sheldon | Dec. 24, 1872 |
| 293,784 | Ravenscroft | Feb. 19, 1884 |
| 613,352 | Boveroux | Nov. 1, 1898 |
| 663,164 | Fauber | Dec. 4, 1900 |
| 689,364 | McDonner | Dec. 17, 1901 |
| 900,424 | Rother | Oct. 6, 1908 |
| 905,383 | Sterba | Dec. 1, 1908 |
| 1,118,227 | Pepple | Nov. 24, 1914 |
| 1,305,276 | Gibson | June 3, 1919 |
| 1,900,867 | Olds | Mar. 7, 1933 |